L. BELL.
Dough Kneaders.
No. 133,823.      Patented Dec. 10, 1872.
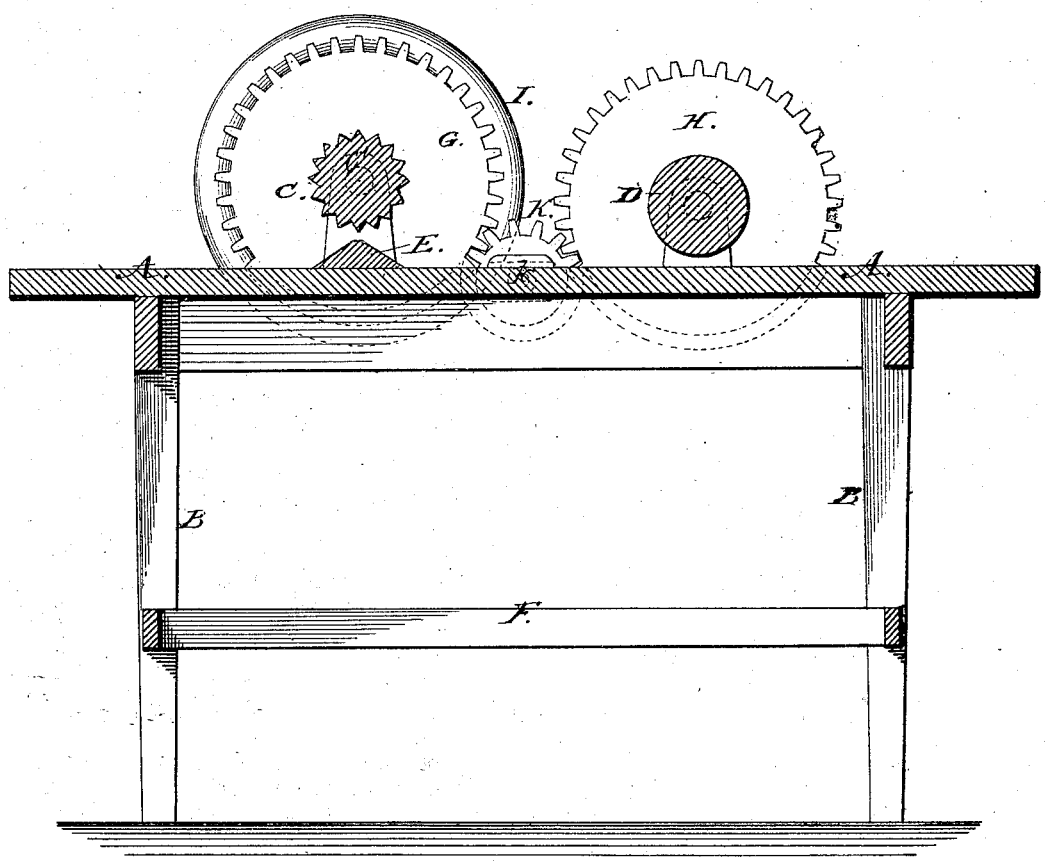

UNITED STATES PATENT OFFICE.

LANDROW BELL, OF WASHINGTON, DISTRICT OF COLUMBIA.

IMPROVEMENT IN DOUGH-KNEADERS.

Specification forming part of Letters Patent No. 133,823, dated December 10, 1872.

*To all whom it may concern:*

Be it known that I, LANDROW BELL, of the city and county of Washington, District of Columbia, have invented certain new and useful Improvements in Machines for Kneading Dough, of which the following is a full, clear, and exact description, reference being had to the accompanying drawing, which is a section through the table and rollers.

The invention consists in the employment of a fluted roller arranged over a double inclined board, and a smooth roller over a plain surface for kneading dough, the action upon the dough being similar to that where the operation is performed by hand.

In the drawing, A represents the top of a table provided with legs and cross-bar for supporting said legs. This top is provided a short distance from the end with a bridge or double incline, as shown at E, and over this incline E is a fluted roller, C, supported in bearings, shown in dotted lines at C'. A short distance in front of this fluted roller is a smooth roller, D, supported in the same manner as roller C, but arranged in a lower plane, so as to work directly in connection with the top of the table. The roller C is provided at both ends with short axles extending through the bearings. One of these axles has a cogged gear, G, keyed to it, and also a balance-wheel, I. This balance-wheel is provided with a crank-handle, not shown, for operating the device. The opposite end of roller C is provided only with a balance-wheel similar to that to which the crank is applied. The gear G on roller C drives a smaller gear, K, arranged between the two rollers C D on a stub-axle, shown in dotted lines at k. This gear in turn drives another gear, H, upon the end of roller D, which is the same size as the gear on roller C.

The operation of the machine is as follows:

The dough, being mixed in the usual manner, is placed on the table in front of the fluted roller C. The device is set in motion by the operator turning the crank, which in turn moves the rollers by means of the gearing described, and the dough is fed to the fluted roller, first passing up the incline or bridge, and between it and the fluted roller; thence down the incline on the other side, the dough in its passage being thoroughly worked or kneaded by being cut and pressed between the roller and the apex and inclines of the bridge or double incline E, and is then passed to the smooth roller D and pressed or rolled out. This operation is repeated as often as is found desirable by reversing the movement of the rollers and permitting the dough to feed back and forth between them.

The action upon the dough resembles that where the operation is performed by hand, except that it will be found that it may be more perfectly accomplished with much less expenditure of time and labor, from five to ten minutes' operation of the rollers back and forth being all that will be required to thoroughly knead and prepare the dough.

The rollers may be made adjustable to adapt them to the amount of dough to be operated upon, and the size of the machine may be varied to suit the requirements of the user.

Having thus described my invention, what I claim as new, and desire to secure by Letters Patent, is—

The combination of the fluted roller C, double incline E, smooth roller D with the table A, arranged and operating substantially as described.

LANDROW BELL.

Witnesses:
JAMES S. GRINNELL,
THOS. JEWELL.